United States Patent [19]

Van Den Elst et al.

[11] Patent Number: 4,963,716
[45] Date of Patent: Oct. 16, 1990

[54] VEHICULAR AIR HEATER USING PTC HEATER TABLETS ASSOCIATED WITH FUNNEL HEAT EXCHANGES

[75] Inventors: Fredrik M. N. Van Den Elst, Almelo; Hendrikus Velten, Enter, both of Netherlands

[73] Assignee: Texas Instruments Incorporated, Dallas, Tex.

[21] Appl. No.: 187,185

[22] Filed: Apr. 28, 1988

[30] Foreign Application Priority Data

May 1, 1987 [NL] Netherlands ............ 8701036

[51] Int. Cl.⁵ .............. H05B 1/02; H05B 3/14; F24H 3/04
[52] U.S. Cl. .................. 219/202; 219/203; 219/505; 219/530; 219/540; 338/22 R
[58] Field of Search ......... 219/202, 505, 530, 540, 219/504, 203, 374, 375, 381, 382; 338/22 R

[56] References Cited

U.S. PATENT DOCUMENTS

| | | | |
|---|---|---|---|
| 2,546,355 | 3/1951 | Bloomer | 219/203 |
| 3,250,325 | 5/1966 | Rhodes et al. | 219/375 U X |
| 3,313,915 | 4/1967 | Chamberlain | 219/202 X |
| 3,331,940 | 7/1967 | Reid | 219/203 |
| 3,496,855 | 2/1970 | De Boer | 219/202 X |
| 4,414,052 | 11/1983 | Habata et al. | 219/540 X |

FOREIGN PATENT DOCUMENTS

| | | | |
|---|---|---|---|
| 243077 | 10/1987 | European Pat. Off. | 219/202 |
| 53-125641 | 11/1978 | Japan | 219/375 |
| 58-39042 | 3/1983 | Japan | 219/540 |
| 2076270 | 11/1981 | United Kingdom | 219/540 |

Primary Examiner—Anthony Bartis
Attorney, Agent, or Firm—James P. McAndrews; John A. Haug; Melvin Sharp

[57] ABSTRACT

An air heater mounted in an elongated ventilation slot located beneath a window of a land, sea or air vehicle has a plurality of self-regulating ceramic heater tablets having a positive temperature coefficient (PTC) positioned between two metal strips and fastened thereto in thermally and electrically conductive relation.

Heat exchangers comprising sheet metal fins with baffles are secured in electrically and thermally conductive relation to the opposite sides of the strips so that the baffles introduce turbulence into the air flowing over the strips. Other metal strips having electrical terminals are thermally and electrically connected to the fins opposite the first named strips for energizing the heater tablets. The PTC tablets are spaced to define flow passages therebetween so that the air flowing through the ventilation slot passes over the heat exchangers, plates and tablets for rapidly withdrawing heat from the tablets. At least one of the plates can be divided into segments with gaps therebetween to accomodate thermal expansion of the plates.

7 Claims, 2 Drawing Sheets

VEHICULAR AIR HEATER USING PTC HEATER TABLETS ASSOCIATED WITH FUNNEL HEAT EXCHANGES

BACKGROUND OF THE INVENTION

The invention relates to a land, sea or air vehicle provided with a cabin having windows or windscreens, under at least one of which a dashboard or panel provided with ventilation slots is disposed.

In all motor vehicles a device is provided for heating the ventilation air which is to be directed onto the windscreen or to the passengers, making use of a heating radiator in which the ventilation air can be brought into a heat exchange relationship with the engine cooling water. Heated air is necessary in order to demist or defrost the windscreen. One problem is that when starting off with a cold engine the cooling water is still cold, so that the ventilation air cannot be heated, and therefore demisting or defrosting is impossible. This can lead to dangerous situations. In modern motor vehicles increasing use is made of glass, so that this problem becomes more urgent. Furthermore, engines are becoming more and more efficient, so that it takes longer for engine heat to become available for heating the interior of the vehicle.

BRIEF SUMMARY OF THE INVENTION

The invention seeks to avoid the disadvantage referred to, and to provide an arrangement whereby the cold ventilation air can be brought within a very short time to a temperature at which demisting and/or defrosting can be effected in an adequate manner.

According to this invention, an air heater device for a passenger compartment of a motor vehicle has a plurality of self-regulating electrical resistance heater elements of a ceramic material of positive temperature coefficient of resistivity held between facing sides of two thermally and electrically conductive metal strips in thermally and electrically conductive relation to the strips, has sheet fins comprising sheet materials with a large number of louvers or baffles offset therefrom secured in electrically and thermally conductive relation to the opposite sides of the metal strips so that the baffles stand out from the metal strips and introduce turbulence into air flowing over the strips, has other metal strips held in thermally and electrically conductive relation to the sheet fins opposite the first named strips, has electrically conductive terminals connected to the other metal strips for connecting the heater elements in an electrical circuit in parallel relation to each other for energizing the heater elements, and has a housing for mounting the device and defining an air flow path directing air through the device in close heat-transfer relation to the sheet fins, whereby the device is adapted to be energized when the vehicle is started from promptly providing heat to the passenger compartment thereof. Preferably at least one side of each heater element is secured to close heat-transfer relation to one of the first named metal strips with an elastically and thermally conductive adhesive or solder and the strips are preferably segmented to permit close engagement of the strips with the heater elements without risk of damage to elements. According to a preferred invention, a heating device is for this purpose installed in one or more of the ventilation slots, this device having a relatively great length and slight width and being composed of a pair of plates between which are fastened tablets of a material having a positive temperature coefficient (PTC), while a heat exchanger is connected to the plate and means are provided for supplying electric energy to the tablets.

The heating device has minimum heat capacity, so that the air can be heated quickly. Without sophisticated control mechanism it is ensured that the temperature cannot rise above a value determined by the properties of the PTC material. The heating device can be compact and light in weight, can be produced in modules, and can without great difficulty be adapted to the shape and dimensions of the ventilation slots.

Good transfer of heat and a strong construction are achieved if the heating device is a sandwich, formed by at least two plates provided with a heat exchanger, with PTC tablets fastened between them.

The pressure drop over the heat exchangers can be restricted to a minimum if they are of the plate type. This is necessary because the fans generally used have a high output and a low head.

In order to distribute the air current in the direction of flow and thereby to improve heat-transfer without substantially increasing the pressure drop, the fins may have louver-like offsets which distribute the air current in the direction of flow. Another possibility is for the fins to consist of a plurality of crenellated bent strips, which can be formed from a length of material and which, viewed in the transverse direction of the heat exchanger, are disposed one behind the other, while the crenellations, viewed in the longitudinal direction of the heat exchanger, are staggered in relation to each other.

The invention also relates to a heating device clearly intended for the above described land, sea or air vehicle.

DESCRIPTION OF THE DRAWINGS

The invention will now be explained more fully with the aid of the drawings, in which two examples of embodiments are illustrated.

FIG. 2b shows a variant of the device of FIG. 2a.

FIG. 5 is a perspective view of a part of the heating device shown in FIG. 4.

FIG. 6 is a longitudinal section of a heating device according to FIGS. 3 and 4.

DESCRIPTION OF THE PREFERRED EMBODIMENTS

Figure 1:
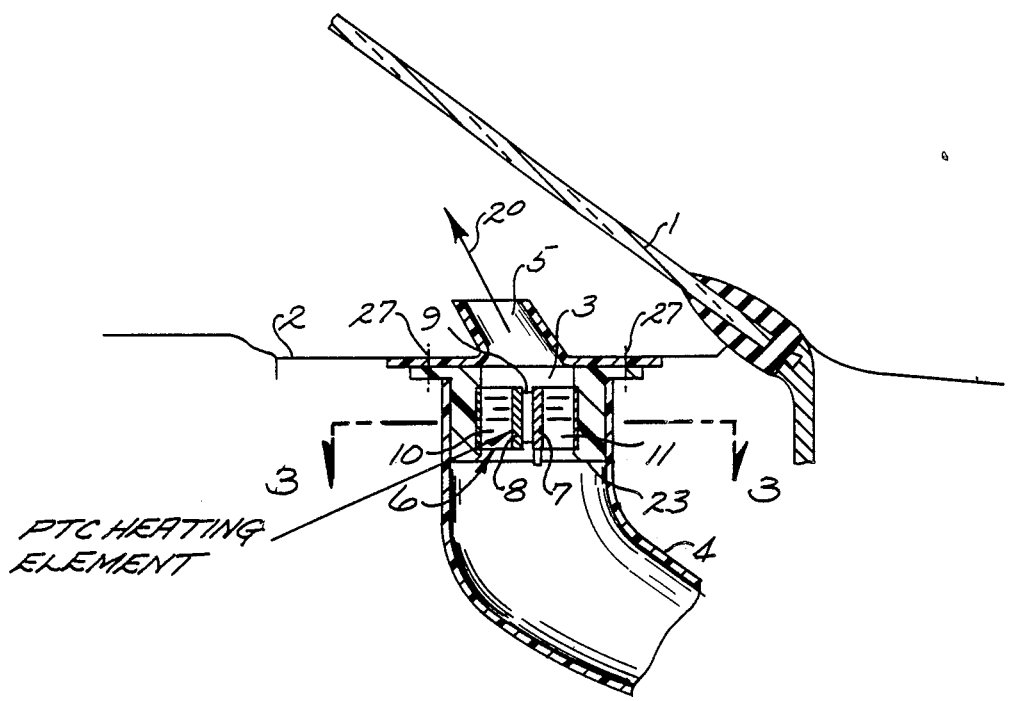
FIG. 1 is a section through a ventilation slot under the windscreen of a motor vehicle, showing a first form of construction of a heating device.
Figure 4:
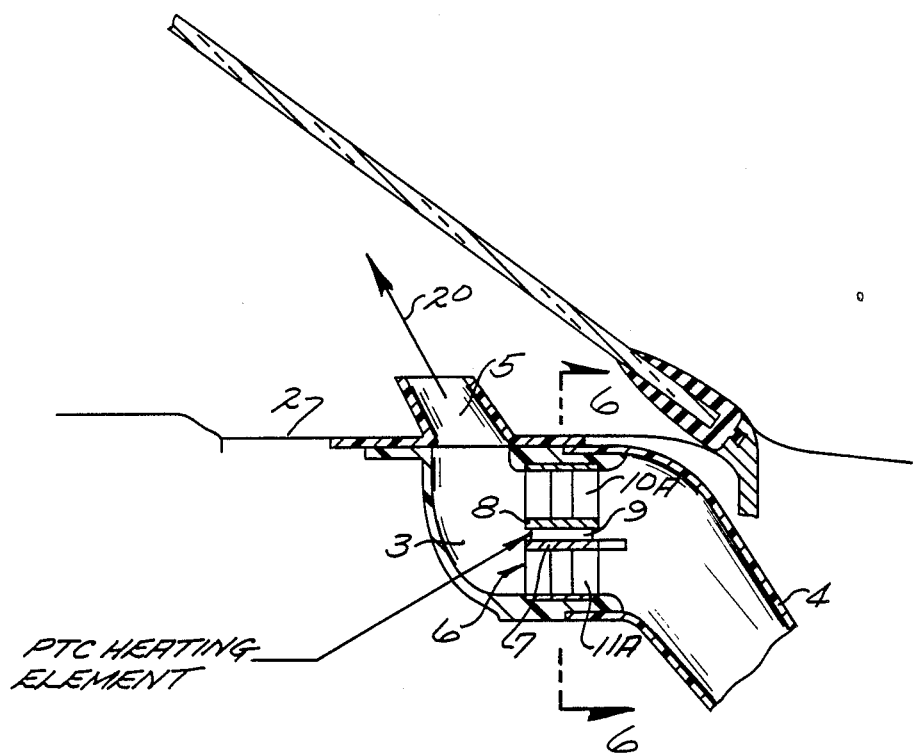
FIG. 4 is a section through a ventilation slot under the windscreen of a motor vehicle, in which a second form of construction of a heating device is shown.

FIGS. 1 and 4 show in section the part of the cabin of a motor vehicle which is situated just under the windshield 1. As is customary, a plurality of ventilation slots 3 or the like are provided in the top edge of the dashboard 2 so that a stream of air furnished by fan means or the like (not shown) is directed from the duct 4 through the heater device 6 as indicated by the arrow 20, the duct in a conventional vehicle typically leading to the slots 3 from a heating radiator and being connected to the slots. The slots have an air outlet baffle 5 directing the stream of air toward the inner surface of the windshield. Alternately, the air is utilized for heating the vehicle compartment as will be understood. For example, the duct 4 is cemented to the heater device 6 and the device is attached to the dashboard by screws indicated at 27.

Figure 3:
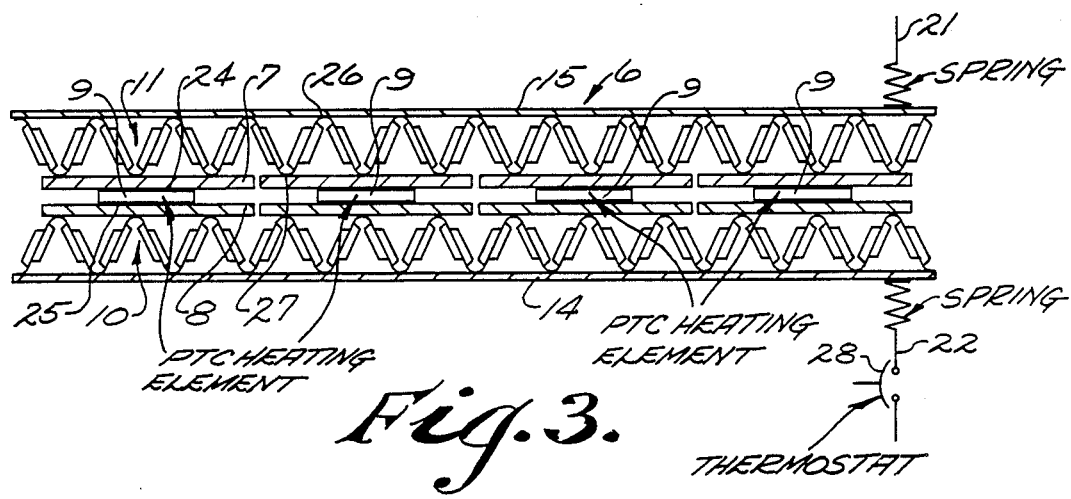
FIG. 3 is a longitudinal section of the heating device shown in FIGS. 1 and 2.

According to the invention, the heating device 6 is mounted to intercept and pass the stream of air 20 being directed through the slots 3.. This device consists in both embodiments of a sandwich composed of two metal strips 7 and 8 of a material of preferably high thermal and electrical conductivity, a plurality of self-regulating electrical resistance heater elements such as tablets 9 of an electrically resistive material of a ceramic material or the like having a positive temperature coefficient of resistivity (PTC) held or fastened between the strips 7 and 8, two heat exchanger strips or means 10 and 11, preferably two outer strips 14 and 15, electrical conductor means which may include terminal spring means as diagrammatically indicated at 21 and 22 for connecting the resistance heater elements 9 in parallel relation to each other in an electrical circuit through strips 7, 8, 10, 11, 14 and 15, and housing means 23, preferably of an electrical and thermal insulating material, for mounting the heater device 6 to the dashboard 2 and/or to the duct 4. If desired, the spring means 21 and 22 are pressed between the housing and the strips 14 and 15 for holding the assembly shown in FIG. 3 in the housing. The strips 7 and 8 can extend across the full width or length of the heater device 6 if desired but are (preferably) segmented or divided into separate sections as shown in FIG. 3. The tablets or resistance heater elements 9 preferably have metal electrical contact surfaces thereon at opposite sides of the elements disposed in thermally conductive, and electrically conductive relation to the respective strips 7 and 8. In a preferred embodiment, at least one of those sides of the tablets 9 is bonded fast to at least one of the strips 7 with the aid of an electrically and thermally conductive adhesive or solder or the like as indicated at 24 in FIG. 3. Preferably the opposite side of each element is secured in close thermally and electrically conductive relation to the other strip and if desired the same or similar bonding to the other strip is used as indicated at 25 in FIG. 3.

Figure 2A:
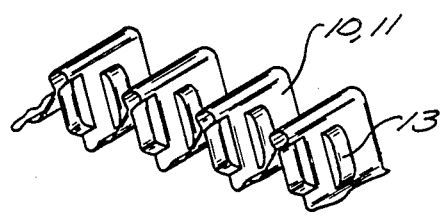
FIG. 2a is a partial view partially in section and in perspective of a part of the heating device used in the embodiment shown in FIG. 1.
Figure 2B:
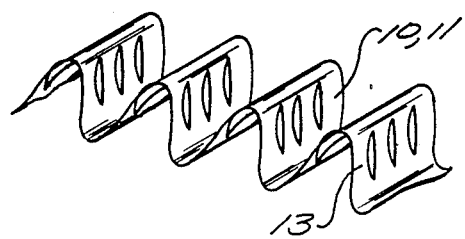

In the embodiment shown in FIGS. 1-3, the heat exchangers 10 and 11 consist of sheet fins having sheet materials which are preferably bent approximately sinusoidally and in which louvers, baffles, or louver-like offsets 13, inclined or not relative to the axes of the bends in the sheet materials, are provided in order to introduce turbulence and dispose or distribute air or other fluid flowing over the sheet fins for improving heat-transfer between the sheet fins and the air. The sheet fins 10 and 11 are disposed and preferably fastened between the strips 7 and 8 respectively and the outer, preferably relatively thinner metal strips 14 and 15 respectively by means of electrically conductive adhesive bonding or soldering or the like as indicated at 26 and 27 or by clamping in any conventional manner as by use of spring means 21 and 22 for improving heat-transfer between the resistance heater elements 9 and various portions of the heat exchanger means 10 and 11. The construction of some of these sheet fins is illustrated and described in the book "Compact Heat Exchangers" by Kays and London, 3rd Impression, 1984, page 178, FIGS. 9-5 and it will be understood that various sheet/- baffle configurations can be used. In accordance with the invention, the offsets 13 are bent out of sheet material of the sheet fins as shown in FIG. 2a, or are turned through a small angle in relation to the sheet material of the sheet fins as shown in FIG. 2b.

The embodiment illustrated in FIGS. 4-6 differs from that shown in FIGS. 1-3 in that the ventilation slots 3 have a rather different shape and in that the heat exchangers 10A and 11A are of different construction. The sheet fins between the sheets 7 and 8 respectively and the strips 14 and 15 respectively consist of three strips 16, 17, and 18 staggered in relation to each other and bent into a crenellated shape. The air current is broken up by these strips in the passages a number of times. The construction of these fins is illustrated and described in the book "Compact Heat Exchangers" by Kays and London, 3rd Impression, 1984, page 185, FIGS. 9-16.

The heat exchangers shown produce excellent heat-transfer, while the pressure drop over the heat exchangers is slight. Because of their small dimensions in the direction of flow, they also fit into modern double-walled dashboards or elsewhere in the passenger compartment. Where one side of the heater tablets 9 is secured to a strip 7 or 8 with electrically and thermally conductive adhesive or solder to provide high heat-transfer, the division of the strip means 7 into plural segments as shown permits the strips to be in close engagement with the heater tablets and to be pressed into the housing with reduced risk of cracking of the tablets. The electrical connection to the heater elements 9 via the sheet fins also permits a compact structure to be utilized.

When the heat exchangers are in operation, the temperature in the sheets 14 and 15 will be lower than that in the sheets 7 and 8. The plastic casing in which the heating device is disposed will then also be thermally loaded to a lesser extent.

When the engine is started, it can be ensured with the aid of a circuit arrangement that the electric current is fed automatically to the heating device, so that the air will be heated almost instantaneously, while after the ventilation air has been heated in the heating radiator to a sufficiently high temperature, the electric current supply to the heating device is switched off by means of a thermostat as indicated diagrammatically at 28 in FIG. 3. It is naturally also possible for the electric current supply to the heating device to be switched on and off by means of a manually operated switch.

A heat exchanger of modular construction as shown in FIGS. 1-3 is, for example, 26 mm wide, 10 mm high, and 160 mm long, and comprises 4 PTC tablets. In tests with a heat exchanger of this kind, installed in ventilation slots in a motor vehicle, it was found that with a cabin temperature of 8° C. the consumption of electricity increased from 380 to 560 watts when the amount of air flowing through was increased from 40 to 170 cubic meters per hour, while the pressure drop rose from 0.5 to only 3 mm water column. The tablets reached a temperature of 180° C. It was also found that, by the application of the invention misted panes were demisted almost immediately after the electric current to the heating device was switched on. The heating device is disposed exactly under the pane, so that between its departure from the heat exchanger and its arrival at the pane the heated air scarcely loses any heat.

It should be understood that although particular embodiments of the invention are shown by way of illustration. The invention includes all modifications and equivalents falling within the scope of the appended claims.

I claim:

1. In a land, sea or air vehicle provided with a cabin having a window, under which a panel is provided with an elongated ventilation slot through which air flows into the interior of the vehicle, the improvement comprising a heating device installed in the slot, the heating device having a relatively great length and a slight width and being composed of a pair of plates to a face of which are fastened tablets of material of positive temperature coefficient (PTC), and a heat exchanger connected in heat exchange relationship to each plate, each heat exchanger comprising fins upstanding from the other face of each plate to define air flow passages in a selected direction therebetween and having baffle means extending into the passages to introduce turbulence in air flowing through the passages, a sandwich being formed by the two plates with the PTC tablets fastened between the plates, the PTC tablets being disposed at spaced locations along the plates to define air flow passages therebetween so that air flowing in said selected direction is permitted to flow through the heat exchanger passages and between the plates around the PTC tablets, means for supplying electric energy to the tablets for producing heat, and means for mounting the heating device in the ventilation slot to direct air flowing through the slot to pass in said selected direction through the heat exchanger passages and between the plates around the PTC tablets in heat exchange relationship with the heat exchangers, plates and tablets for rapidly withdrawing said heat produced from the tablets.

2. In a land, sea or air vehicle provided with a cabin having a window under which a panel provided with a ventilation slot is disposed, and a heating device installed in the ventilation slot, the heating device having a relatively great length and a slight width the improvement wherein said heating device comprises two plates to a face of which are fastened tablets of material having a positive temperature coefficient (PTC), a heat-exchanger connected in heat-exchange relationship to the other face of each plate, and means for supplying electric energy to the tablets for producing heat, the heating device comprising a sandwich formed by the two plates provided with the heat exchangers with the PTC tablets fastened between them, at least one of the plates being divided into segments having gaps therebetween to take thermal expansion of the plates segments.

3. In a land, sea or air vehicle according to claim 2, characterized in that the heat exchangers are of the sheet fin type.

4. Land, sea or air vehicle according to claim 3, characterized in that the fins have louver-shaped offsets which distribute and disturb the air current in the direction of flow.

5. In a land, sea or air vehicle according to claim 3, characterized in that the fins consist of a plurality of strips bent into a crenellated shape and, viewed in the transverse direction of the heat exchanger, lying one behind the other, while the crenellation, viewed in the longitudinal direction of the heat exchanger, are staggered in relation to one another.

6. An air heater device for a passenger compartment of a motor vehicle comprising a plurality of self-regulating electrical resistance heater elements of a ceramic material of positive temperature coefficient of resistivity (PTC) held at spaced locations between facing sides of two thermally and electrically conductive metal strips so that sides of the heater elements are in thermally and electrically conductive relation to the strips and so that fluid flow is permitted in a selected direction between the strips through the space between the spaced heater elements, a pair of electrically conductive sheet fins each having fins with a large number of baffles offset therefrom, secured in electrically and thermally conductive relation to the opposite sides of the metal strips so that the baffles stand out from the fins of the sheet fins and introduce turbulence into air flowing over the strips, a pair of other metal strips held in thermally and electrically conductive relation to the sheet fins opposite the first names strips, electrically conductive terminal means connected to the other metal strips for connecting the heater elements in an electrical circuit between said two strips in parallel relation to each other for energizing the heater elements to produce heat, and a housing for mounting the device and for defining an air flow path directing air through the device between said other strips, over said sheet fins and first named strips, and around the heater elements between the first named strips in close heat-transfer relation to the heater elements, the strips and the sheet fins, whereby the device is adapted to be energized when the vehicle is started for promptly providing heat to the passenger compartment thereof.

7. A heater device for a passenger compartment of a motor vehicle comprising a plurality of selfregulating electrical resistance heater elements of a ceramic resistance material of positive temperature coefficient of resistivity (PTC) held between facing sides of two thermally and electrically conductive metal strips in thermally and electrically conductive relation to the heater elements, a pair of electrically conductive sheet fins, each having a large number of baffles offset therefrom, secured in electrically and thermally conductive relation to opposite sides of the metal strips so that the baffles stand out from the fins and introduce turbulence into air flowing over the strips, a pair of other metal strips held in thermally and electrically conductive relation to the sheet fins opposite the first named strips, electrically conductive terminal means connected to the other metal strips for connecting the heater elements in an electrical circuit between said two strips in parallel relation to each other for energizing the heater elements, and a housing for mounting the device and for defining an air flow path directing air through the device in close heattransfer relation to the sheet fins, whereby the device is adapted to be energized when the vehicle is started for promptly providing heat to the passenger compartment thereof, the heater device having at least one side of each heater element secured in close heat-transfer relation to one of the first-named metal strips and having that strip segmented into spaced portions secured to said engagement of the strip with the heater elements without risk of damage to the elements due to thermal expansion of that strip.

* * * * *